(12) United States Patent
Funada

(10) Patent No.: US 7,027,626 B2
(45) Date of Patent: Apr. 11, 2006

(54) SYSTEM AND METHOD FOR PROCESSING FINGERPRINT/PALMPRINT IMAGE

(75) Inventor: Jun-ichi Funada, Tokyo (JP)

(73) Assignee: NEC Corporation, Tokyo (JP)

( * ) Notice: Subject to any disclaimer, the term of this patent is extended or adjusted under 35 U.S.C. 154(b) by 513 days.

(21) Appl. No.: 10/105,246

(22) Filed: Mar. 26, 2002

(65) Prior Publication Data

US 2002/0164056 A1   Nov. 7, 2002

(30) Foreign Application Priority Data

Mar. 26, 2001   (JP)   ............................. 2001-087712

(51) Int. Cl.
   *G06K 9/00*   (2006.01)
(52) U.S. Cl. .................. 382/125; 340/5.83; 902/3
(58) Field of Classification Search ................ 382/115, 382/124–125; 356/71
   See application file for complete search history.

(56) References Cited

U.S. PATENT DOCUMENTS

| 5,937,082 A | 8/1999 | Funada |
| 6,118,891 A | 9/2000 | Funada |
| 6,233,348 B1 * | 5/2001 | Fujii et al. .................. 382/125 |

FOREIGN PATENT DOCUMENTS

| EP | 0 551 086 A2 | 7/1993 |
| JP | 60-059481 | 4/1985 |
| JP | 9-167230 | 6/1997 |
| JP | 2765335 | 4/1998 |
| KR | 00267262 | 7/2000 |

OTHER PUBLICATIONS

"Classification of Fingerprint Patterns by Relaxation Method", the 22$^{nd}$ National Convention (1981 First Term, Session), Information Processing Society of Japan, Kawakoshi et al.

A.P. Fitz et al., "Fingerprint Classification Using a Hexagonal Fast Fourier Transform," *Pattern Recognition*, 1996, 29(10):1587-1597, Pattern Recognition Society by Elsevier Science Ltd., Great Britain.

J. Funada et al., "Feature Extraction Method for Palmprint Considering Elimination of Creases," *Pattern Recognition* 1998, Proceedings,Fourteenth International Conference, Aug. 16-20, 1998, pp. 1849-1854.

* cited by examiner

*Primary Examiner*—Samir Ahmed
*Assistant Examiner*—Charles Kim
(74) *Attorney, Agent, or Firm*—Foley & Lardner LLP

(57) ABSTRACT

In a fingerprint/palmprint image processing system and method, for local regions other than a highly reliable region, a ridge line image which can be estimated to represent a ridge line is selected from ridge line candidate images, and whether or not each of the selected ridge line images is valid as an image representing a ridge line is discriminated. Thus, a whole image is generated on the basis of the ridge line image in the highly reliable region and the ridge line images which were discriminated to be valid in the other regions.

9 Claims, 9 Drawing Sheets

Fig. 8
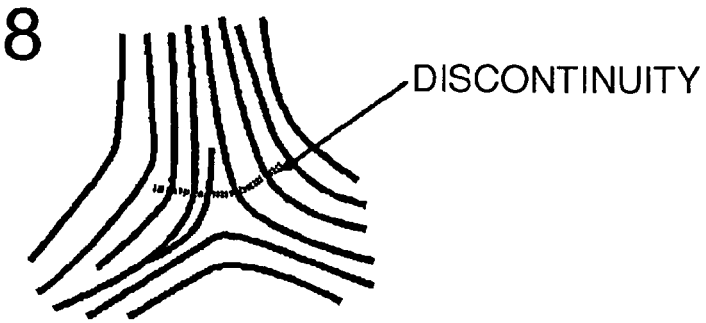
Fig. 13 (a)
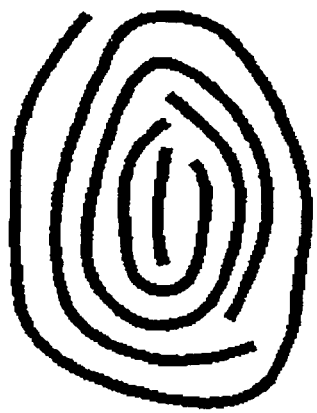
CORE
(b)
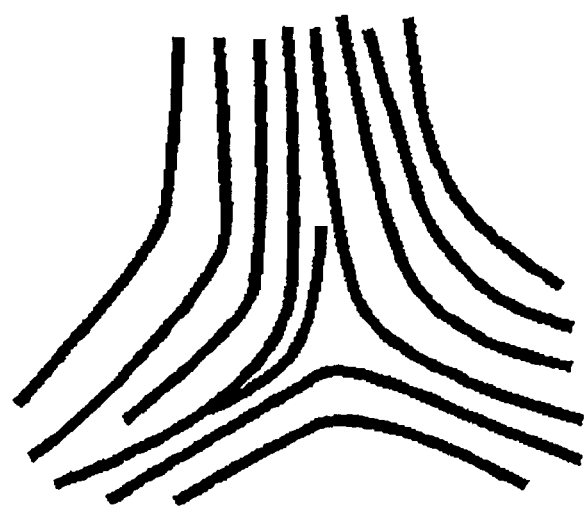
DELTA

SYSTEM AND METHOD FOR PROCESSING FINGERPRINT/PALMPRINT IMAGE

BACKGROUND OF THE INVENTION

The present invention relates to fingerprint/palmprint image processing system, method and program, for use in fingerprint collation, fingerprint classification and palmprint collation, etc.

In the prior art, a method for automatically extracting a ridge line information such as a ridge line direction and a ridge line pitch from an fingerprint/palmprint image includes, for example, a "Ridge Line Direction Pattern Smoothing Method and System" described in Japanese Patent No.2,765,335, and "Classification of Fingerprint Patterns by Relaxation Method", the 22nd National Convention (1981 First Term Session), Information Processing Society of Japan by Kawakoshi et. al.

The "Ridge Line Direction Pattern Smoothing Method and System" describes a technique based on the theory of minimizing energy. An evaluation function is assigned for an extracted direction for each two-dimensional local region of an image with a scale of reliability. By minimizing the evaluation function, the ridge line pattern is smoothened. On the other hand, in the "Classification of Fingerprint Patterns by Relaxation Method," information of directions extracted for each two-dimensional local region of an image is smoothened by a so-called relaxation method.

In the method described in Japanese Patent No.2,765,335, however, if it is intended to smoothen an image including a wrinkle, circumferential regions are smoothened in line the wrinkle, and it is in some cases that the wrinkle is rather emphasized, On the other hand, in the technology described for the classification of the fingerprint pattern by the relaxation method, although the relaxation method is used as the technique for smoothening information of direction extracted for each local region, the smoothening is carried out in line with the wrinkle for the part of existing wrinkles which also frequently exist in palmprint and which are parallel to each other at a similar pitch and extent over a large area, with the result that the wrinkles are emphasized.

The inventor of the present application proposes in Japanese Patent Application Pre-examination Publication JP-A-09-167230 (which corresponds to U.S. Pat. No. 5,937,082, the content of which is incorporated by reference in its entirety into this application) a fingerprint/palmprint image processor capable of extracting a ridge line image from a fingerprint/palmprint image without receiving the effect of the wrinkle. In this fingerprint/palmprint image processor, an inputted fingerprint or palmprint image is divided into a plurality of blocks, and a plurality of bridge line candidates are detected for each block, and the candidate which can be considered to be surely a ridge line is determined from the detected ridge line candidates in one block, and in the other blocks, ridge line candidates having the consistency with the determined ridge line candidate are chosen. The ridge line spatially continues as a ridge line, and the wrinkle spatially continues as a wrinkle, but, generally, the wrinkle does not continue to the ridge line. Therefore, if a candidate which can be considered to be surely a ridge line is detected, and if a candidate having the continuity with the detected candidate is chosen from other local candidates, it is possible to correctly detect the ridge line in a region including many wrinkles.

FIG. 10 is a block diagram illustrating the fingerprint/palmprint image processor mentioned above. The block diagram of FIG. 10 corresponds to FIG. 9 of JP-A-09-167230, but is one obtained by simplifying FIG. 9 of JP-A-09-167230 in order to simplify the following description. In FIG. 10, the reference number 11 designates an image input means, and the reference number 12 indicates a local information extracting means. The reference number 13 denotes a highly reliable region determining means, and the reference number 14 shows an adjacent region group detecting means. The reference number 15 designates a ridge line candidate selecting means, and the reference number 16 indicates an image generation means. Here, the highly reliable region determining means 13 corresponds to the first ridge line candidate image selecting portion 12, the connectivity evaluating portion 13, the clustering portion 14, and the cluster evaluating portion 15 shown in FIG. 9 of JP-A-09-167230. The adjacent region group detecting means 14 and the ridge line candidate selecting means 15 correspond to the optimum ridge line candidate image selecting portion 17 shown in FIG. 9 of JP-A-09-167230.

FIG. 11 is a flowchart illustrating an operation of the system shown in FIG. 10. In FIG. 11, the image input means 11 reads fingerprint or palmprint as an image, and supplies the image in the form of a digital image to the local information extracting means 12 (S1001). The local information extracting means 12 divides the received original image into two-dimensional local regions (S1002), and extracts from each local region a plurality of images (which will be called a "ridge line candidate image") as a candidate which expresses a ridge line existing in that local region (S1003). The ridge line candidate images are numbered.

The ridge line candidate images thus extracted is supplied to the highly reliable region determining means 13, the ridge line candidate selecting means 15 and the image generation means 16. In the highly reliable region determining means 13, a ridge line candidate which can be considered to be surely a ridge line is detected and a local region including that ridge line candidate (highly reliable region), are determined from the plurality of ridge line candidate images (S1004), and supplied to the adjacent region group detecting means 14, the ridge line candidate selecting means 15 and the image generation means 16.

The adjacent region group detecting means 14 finds all local regions (adjacent region) which adjoin the highly reliable region (S 1005). For example, if it is assumed that the highly reliable regions (regions shown in the dense hatching in FIG. 12-(a)) were detected, regions (regions shown in the dilute hatching in FIG. 12-(a)) which adjoins the highly reliable regions are detected as a adjacent region. Next, whether or not one or more adjacent regions are detected, is discriminated (S1006). For example, in the example shown in FIG. 12-(a), since one or more adjacent regions exist, the processing goes into a step S1007 in which, in each of all the adjacent regions detected, a ridge line image is selected from the ridge line candidate images by the ridge line candidate selecting means 15, and the number of the selected ridge line candidate image is notified to the image generation means 16.

For example, in order to perform the ridge line candidate image selection for the adjacent region "A" shown in FIG. 12-(a), a candidate having a high level of continuity is selected from ridge line candidate images "1" to "6". In this example, the ridge line candidate image "2" is selected.

Thereafter, the processing returns to the step S705. In the highly reliable region or the local region for which the selection of the ridge line candidate image has been completed, all adjacent regions which are neither the highly reliable region nor the local region for which the selection of the ridge line candidate image has been completed, are selected. Namely, in the example shown in FIG. 12-(a), all regions downward adjacent to the adjacent region already detected are found out. Then, in the step S 1006, whether or not one or more adjacent regions are detected, is discriminated. If one or more adjacent regions exist, the processing does to the step S1007, in which, in each of all the adjacent regions, a ridge line image is selected from the ridge line candidate images. In the following, the steps S1005 to S1007 are repeated, and when it is discriminated to be "NO" in the step S1006, since the processing has been completed for all the local regions, the image generation means 16 restores a whole ridge line image by using the selected ridge line candidate images, as shown in FIG. 12-(b) (S1008).

The fingerprint/palmprint image processor mentioned above, disclosed in JP-A-09-167230, can extract the ridge line without being influenced by wrinkles. However, since the ridge line image is determined for each local region by importantly considering the continuity between adjacent regions, another disadvantage is encountered in which, in a ridge line having a large curvature such as a core shown in FIG. 13-(a) and a delta shown in FIG. 13-(b), even if the ridge lines were clear, a candidate image having a wrinkle having a good continuity other than the ridge line is selected, with the result that it fails to extract the ridge line.

BRIEF SUMMARY OF THE INVENTION

Accordingly, it is an object of the present invention to provide a fingerprint/palmprint image processing system, method and program, which have overcome the above mentioned problems of the prior art.

Another object of the present invention is to provide a fingerprint/palmprint image processing system, method and program, capable of precisely extracting the ridge line even in a region having wrinkles existing mixedly together with a ridge line or even in a region including a ridge line having a large curvature.

The above and other objects of the present invention are achieved in accordance with the present invention by a fingerprint/palmprint image processing system comprising a means for reading a fingerprint/palmprint image, an extracting means for dividing the fingerprint/palmprint image into a plurality of local regions and for extracting a plurality of ridge line candidate images which represents ridge lines, for each of the local regions, a highly reliable region determining means for determining, from the ridge line candidate images thus extracted, a ridge line candidate image having a high likelihood of ridge line, and a local region including the ridge line candidate image having the high likelihood of ridge line, as a highly reliable region, means for selecting a ridge line image which can be estimated to represent a ridge line, from the ridge line candidate images extracted by the extracting means, for each of the local regions other than the highly reliable region, a discriminating means for discriminating, for each ridge line image thus selected, whether or not the ridge line image thus selected is valid as an image representing a ridge line, and means for generating a whole image on the basis of the ridge line image in the highly reliable region and the ridge line image which were discriminated by the discriminating means to be valid as the image representing the ridge line.

According to another aspect of the present invention, there is provided a fingerprint/palmprint image processing method comprising a step of reading a fingerprint/palmprint image, an extracting step of dividing the fingerprint/palmprint image into a plurality of local regions and of extracting a plurality of ridge line candidate images which represents ridge lines, for each of the local regions, a highly reliable region determining step of determining, from the ridge line candidate images thus extracted, a ridge line candidate image having a high likelihood of ridge line, and a local region including the ridge line candidate image having the high likelihood of ridge line, as a highly reliable region, a step of selecting a ridge line image which can be estimated to represent a ridge line, from the ridge line candidate images extracted by the extracting step, for each of the local regions other than the highly reliable region, a discriminating step of discriminating, for each ridge line image thus selected, whether or not the ridge line image thus selected is valid as an image representing a ridge line, and a step of generating a whole image on the basis of the ridge line image in the highly reliable region and the ridge line images which were discriminated by the discriminating step to be valid as the image representing the ridge line.

According to still another aspect of the present invention, there is provided a program for causing a computer to execute a procedure of dividing a fingerprint/palmprint image into a plurality of local regions and of extracting a plurality of ridge line candidate images which represents ridge lines, for each of the local regions, a highly reliable region determining procedure of determining, from the ridge line candidate images thus extracted, a ridge line candidate image having a high likelihood of ridge line, and a local region including the ridge line candidate image having the high likelihood of ridge line, as a highly reliable region, a procedure of selecting a ridge line image which can be estimated to represent a ridge line, from the ridge line candidate images extracted by the extracting procedure, for each of the local regions other than the highly reliable region, a discriminating procedure of discriminating, for each ridge line image thus selected, whether or not the ridge line image thus selected is valid as an image representing a ridge line, and a procedure of generating a whole image on the basis of the ridge line image in the highly reliable region and the ridge line images which were discriminated by the discriminating procedure to be valid as the image representing the ridge line.

The above and other objects, features and advantages of the present invention will be apparent from the following description of preferred embodiments of the invention with reference to the accompanying drawings.

BRIEF DESCRIPTION OF THE DRAWINGS

FIG. 8 illustrates an example of discontinuity in which a local information such as a ridge line direction in the fingerprint/palmprint image abruptly changes;

FIGS. 13(*a*) and 13(*b*) illustrate examples of ridge line such as a core and a delta, having a large curvature.

DETAILED DESCRIPTION OF THE INVENTION

Figure 1:
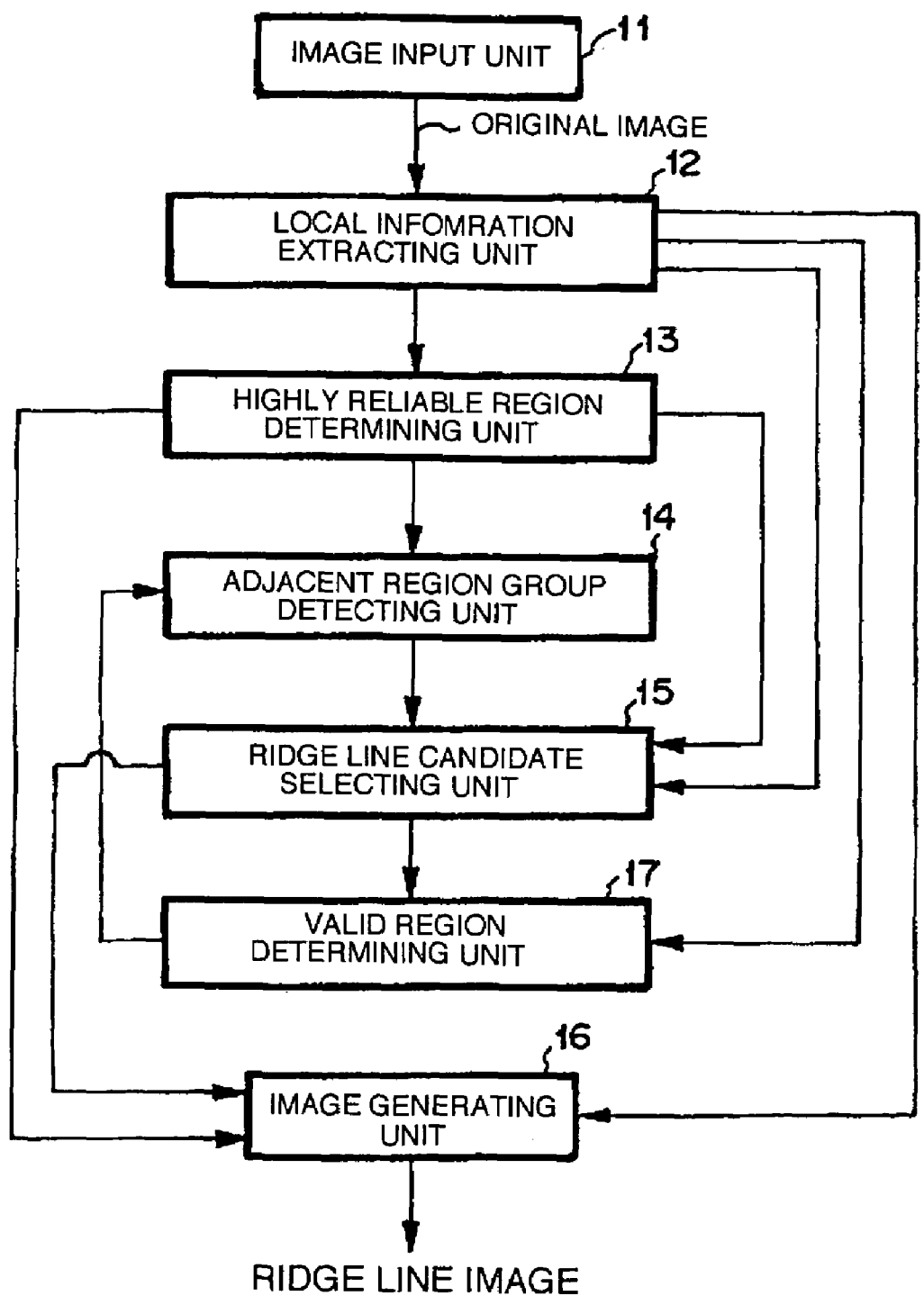
FIG. 1 is a block diagram of a first embodiment of the fingerprint/palmprint image processing system in accordance with the present invention.
Figure 10:
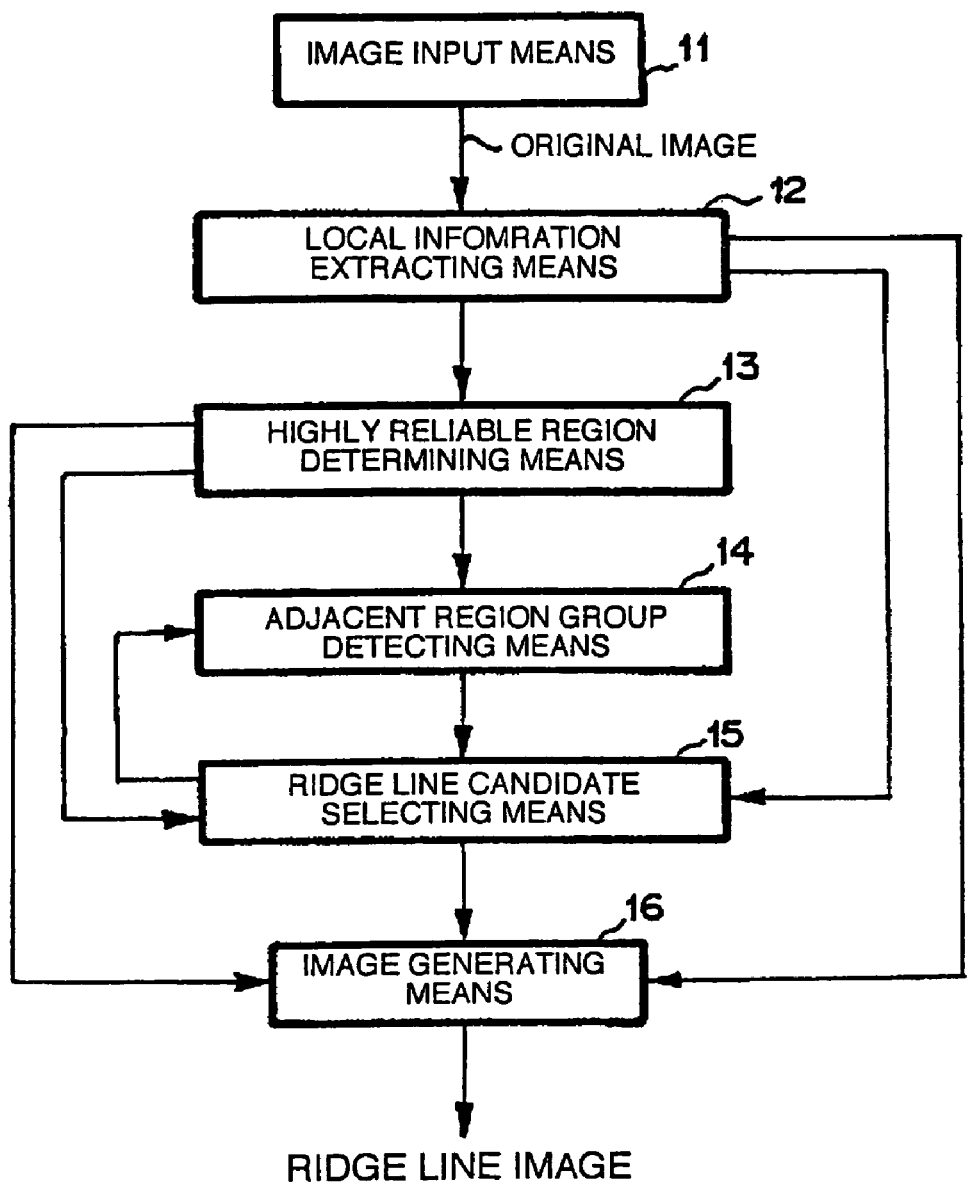
FIG. 10 is a block diagram of an example of the fingerprint/palmprint image processing system in the prior art.
Figure 11:
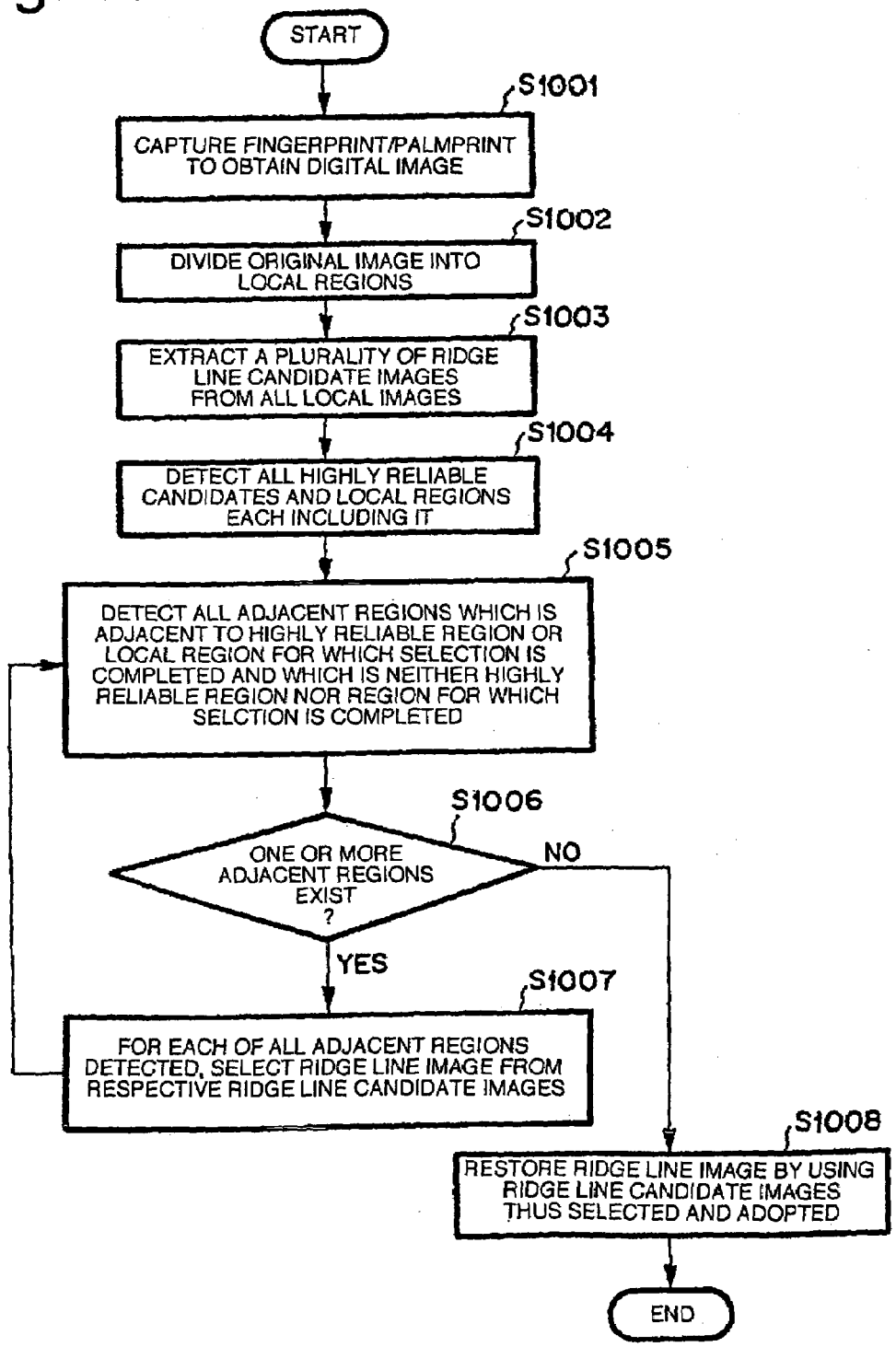
FIG. 11 is a flow chart illustrating an operation of the prior art example shown in FIG. 10.
Figure 12:
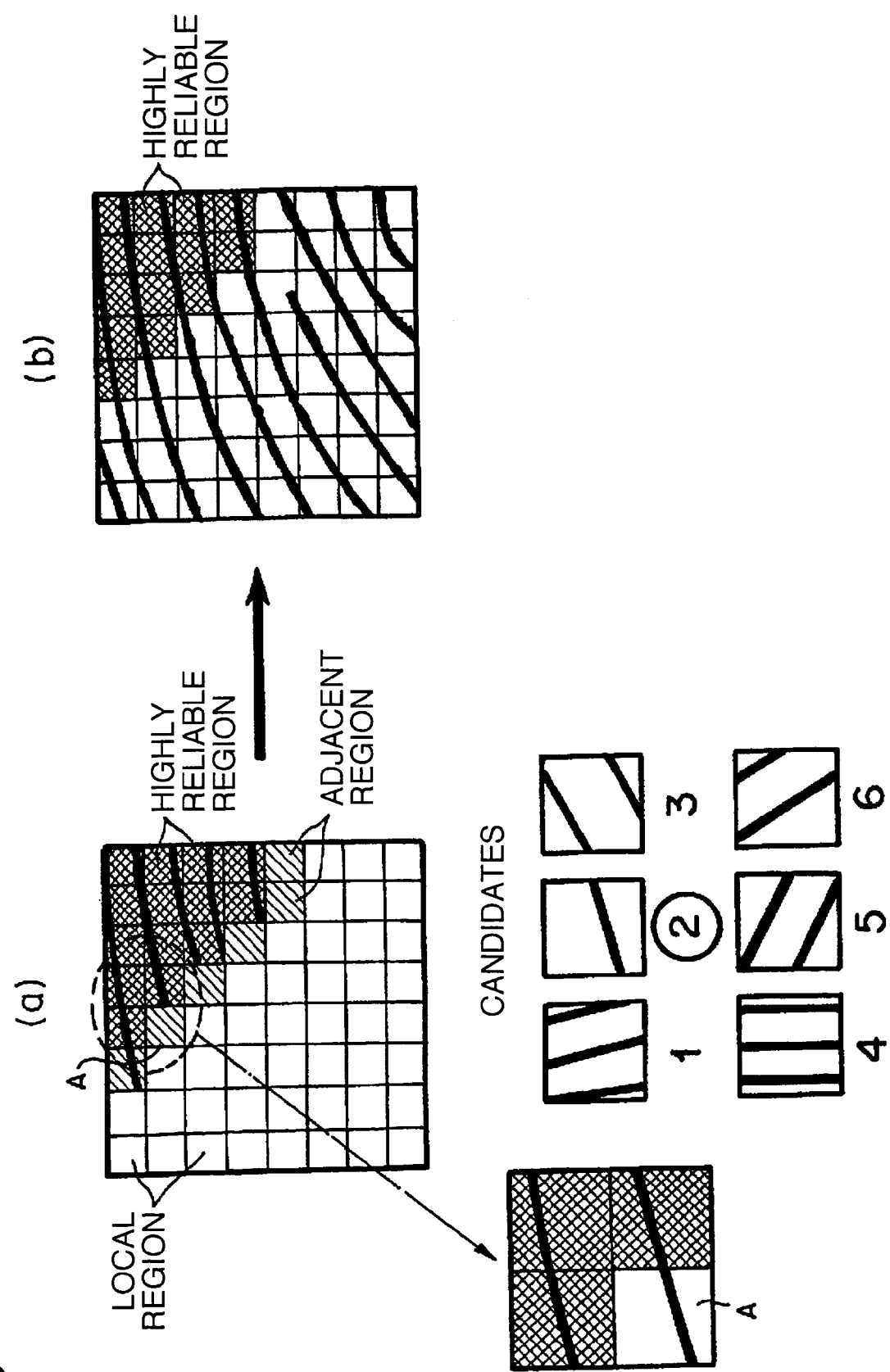
FIGS. 12(*a*) and 12(*b*) illustrate a processing of selection of a ridge line image in the prior art example shown in FIG. 10.

Now, embodiments of the present invention will be described with reference to the accompanying drawings. FIG. 1 is a block diagram of a first embodiment of the fingerprint/palmprint image processing system in accordance with the present invention. In Figure elements corresponding to those shown in FIG. 10 are given the same reference numbers.

In FIG. 1, the reference number 11 designates an image input unit which can be constituted of a scanner or a live scanner for reading a fingerprint/palmprint as an image, to output a fingerprint/palmprint image. The reference number 12 indicates a local information extracting unit receiving the fingerprint/palmprint image from the image input part 11 for dividing the received original fingerprint/palmprint image into two-dimensional local regions, and for extracting from each local region a plurality of ridge line candidate images each of which expresses a ridge line existing in the respective local region.

As described in JP-A-09-167230, for example, the local information extracting unit 12 performs a two-dimensional Fourier transformation for each of the two-dimensional local regions, extracts a plurality of peaks corresponding to two-dimensional sine waves having different peaks, on the resultant Fourier transformation plane, in the order from the largest amplitude or the largest energy in the vicinity of peak, and converts the two-dimensional sine waves corresponding to the peaks, into ridge line candidate images.

The reference number 13 denotes a highly reliable region determining unit for determining a ridge line candidate having a high likelihood of ridge line, from a plurality of ridge line candidate images extracted in the local information extracting unit 12 in each local region, and also for determining a local region including that ridge line candidate having the high likelihood of ridge line, as a highly reliable region.

As described in JP-A-09-167230, the highly reliable region determining unit 13 evaluates the degree of likelihood of ridge line for each of the plurality of ridge line candidate images in each two-dimensional local region, and selects a ridge line candidate image having the highest degree of likelihood of ridge line in each local region. In this case, the highly reliable region determining unit 13 selects a ridge line candidate image having the largest amplitude from the plurality of ridge line candidate images in each local region. An adjacent region group detecting unit 14 selects a local region (adjacent region) which is adjacent to the highly reliable region determined by the highly reliable region determining unit 13 or is adjacent to a group of regions for which the selection of the ridge line candidate image has been completed.

For the adjacent region detected by the adjacent region group detecting unit 14, a ridge line candidate selecting unit 15 evaluates continuity, to select a ridge line image which can be estimated to represent the ridge line, from the ridge line candidate images. A valid region determining unit 17 determines whether or not the ridge line candidate image selected by the ridge line candidate selecting unit 15 is adopted as an image representing the ridge line. An image generation unit 16 generates a whole image of a fingerprint/palmprint. Incidentally, the system shown in FIG. 1 executes a data processing by temporarily storing data in the course of processing to a memory (not shown) and by reading out the data stored in the memory if necessary.

Next, a specific operation of the first embodiment will be described in detail with reference to a flow chart of FIG. 2.

Figure 2:
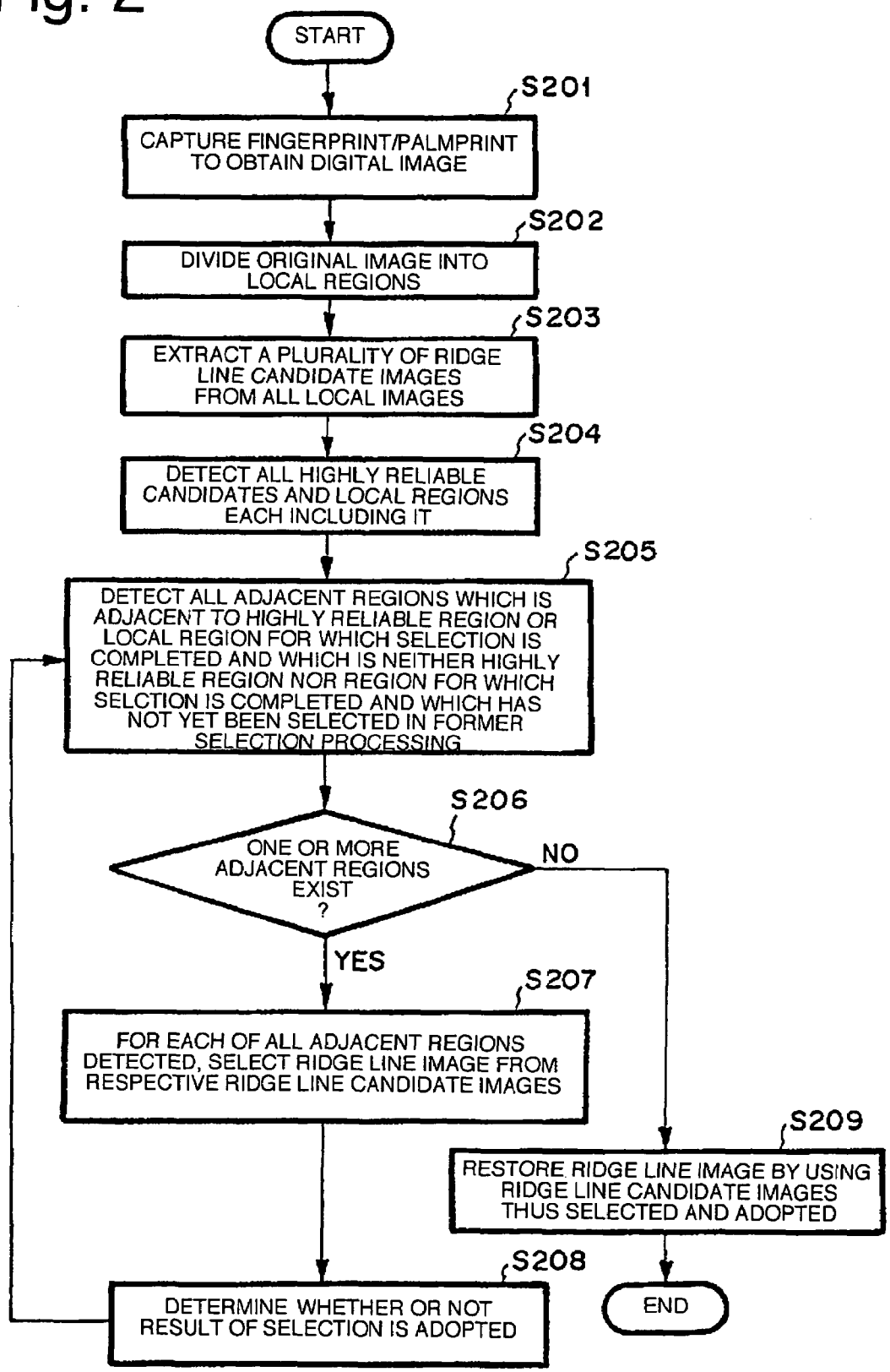
FIG. 2 is a flow chart illustrating an operation of the embodiment shown in FIG. 1.

In FIG. 2, the image input unit 11 reads a fingerprint or a palmprint as a digital image, and supplies an original image of the fingerprint or palmprint to the local information extracting unit 12 (S201). The local information extracting unit 12 divides the received original image into two-dimensional local regions (S202), and extracts from each two-dimensional local region a plurality of ridge line candidate images each of which expresses a ridge line existing in that local region (S203). The ridge line candidate images thus extracted are supplied to the highly reliable region determining unit 13, the ridge line candidate selecting unit 15, the valid region determining unit 17 and the image generation unit 16.

Here, it is assumed that the resolution of the image supplied from the image input unit 11 is 20 pixels/mm, and the local region is a square (See FIG. 3), the length of each side of the local region becomes on the order of 8 pixels to 32 pixels. In the case of extracting the ridge line candidate, as disclosed in JP-A-09-167230, a plurality of relative maximum points of power spectrum in the image of the local region are selected in the order from the largest power spectrum point, and a two-dimensional sine wave corresponding to the relative maximum point is converted into a ridge line candidate image in each local region. For example, six ridge line candidate images are extracted in each local region. Then, a parameter characterizing the sine wave corresponding to the relative maximum point is calculated and recorded from the respective relative maximum point.

Now, one example of the parameter mentioned above will be described. This is described in JP-A-09-167230. First, assuming that the coordinate value of a (n)th peak on the Fourier plane in a local region Iij ($0 \leq i \leq 63$, $0 \leq j \leq 63$) is expressed as ($\xi_n^{(i,j)}, \eta_n^{(i,j)}$), the local information extracting unit 12 calculates the amplitude, the phase, the direction, the frequency, and the power in proximity of the peak.

The amplitude, the phase, the direction, the frequency, and the power in proximity of the peak can be obtained in the following equations (1), (2), (3), (4) and (5), respectively.

$$a_n^{(i,j)} = 2\sqrt{|F(\xi_n^{(i,j)}, \eta_n^{(i,j)})|^2} \quad i = 1, 2, \cdots, 6 \tag{1}$$

$$ph_n^{(i,j)} = \tan^{-1}\left(\frac{\text{Im}\{F(\xi_n^{(i,j)}, \eta_n^{(i,j)})\}}{\text{Re}\{F(\xi_n^{(i,j)}, \eta_n^{(i,j)})\}}\right) \quad i = 1, 2, \cdots, 6 \tag{2}$$

$$d_n^{(i,j)} = \tan^{-1}\left(\frac{\eta_n^{(i,j)}}{\xi_n^{(i,j)}}\right) \quad i = 1, 2, \cdots, 6 \tag{3}$$

-continued $$f_n^{(i,j)} = \frac{1}{64}\sqrt{\left(\xi_n^{(i,j)}\right)^2 + \left(\eta_n^{(i,j)}\right)^2} \quad i = 1, 2, \cdots, 6 \quad (4)$$

$$va_n^{(i,j)} = \frac{4\pi^2\sigma^4}{64^2} \sum_{(\xi,\eta)\in\{(\xi_n^{(i,j)},\eta_n^{(i,j)})\otimes 8\text{proximities}\}} 2|F(\xi,\eta)|^2 \quad (5)$$

In addition, the full power of "f", which is expressed as follows:

$$vt^{(i,j)} = \frac{4\pi^2\sigma^4}{64^2} \sum_{\xi=-32}^{31} \sum_{\eta=-32}^{31} |F(\xi,\eta)|^2 \quad (6)$$

is also calculated. The image determined from these parameters becomes as follows:

$$g_n^{(i,j)}(x, y) = a_n^{(i,j)}\cos[2\pi f_n^{(i,j)}(x\cos(d_n^{(i,j)}) + y\sin(d_n^{(i,j)})) - ph_n^{(i,j)}] \quad (7)$$

This $$\{g_n^{(i,j)}(x, y)\}_{n=1}^6 \quad (8)$$

becomes a candidate image representing the ridge line in each local region. The local information extracting unit 12 calculates these parameters for each of all the local regions:

$$\{\{a_n^{(i,j)}, ph_n^{(i,j)}, d_n^{(i,j)}, f_n^{(i,j)}, va_n^{(i,j)}\}_{n=1}^6, vt^{(i,j)}\}_{i=0,j=0}^{63,63} \quad (9)$$

As described in JP-A-09-167239, the highly reliable region determining unit 13 determines a ridge line candidate having a high likelihood of ridge line (highly reliable candidate) and a local region including the highly reliable candidate (highly reliable region) (S204). The ridge line candidate thus determined and the highly reliable region including the ridge line candidate thus determined are supplied to the adjacent region group detecting unit 14, the ridge line candidate selecting unit 15 and the image generation unit 16. In the highly reliable region determining unit 13, the degree of likelihood of ridge line of all the ridge line candidate images in each of all the local regions is evaluated, and one ridge line candidate image having the highest degree of likelihood of ridge line is selected for each local region, as a highly reliable candidate image.

In this case, the algorithm is that, as described in JP-A-09-167230, the local information extracting unit 12 performs a two-dimensional Fourier transformation for each two-dimensional local region, extracts a plurality of peaks corresponding to two-dimensional sine waves having different peaks, on the resultant Fourier transformation plane, in the order from the largest amplitude or the largest energy in the vicinity of peak, converts a two-dimensional sine wave corresponding to each peak, into one ridge line candidate image, and detects a ridge line candidate image having a maximum amplitude from the ridge line candidate images thus obtained of each two-dimensional local region, as a highly reliable candidate image.

Figure 3:
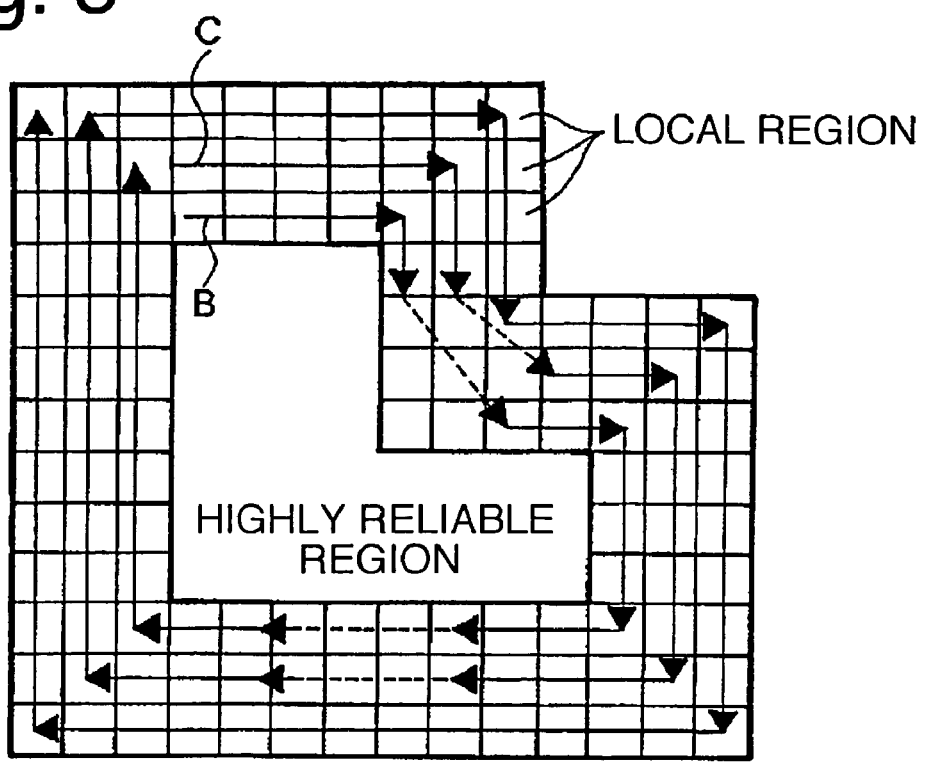
FIG. 3 illustrates the sequence of selection of a ridge line candidate image shown in FIG. 2.

Next, the adjacent region group detecting unit 14 selects all regions adjacent to the highly reliable region (S205). For example, if it is assumed that a central region is detected as the highly reliable region as shown in FIG. 3, local regions of a first single innermost encincture closely surrounding the highly reliable region are detected as adjacent regions. Succeedingly, whether or not one or more adjacent regions are detected, is discriminated (S206). For example, in the example shown in FIG. 3, since a plurality of adjacent regions exist, the processing goes into a step S207. At this case, the adjacent region group detecting unit 14 supplies the adjacent region information to the ridge line candidate selecting unit 15.

In the step S207, as described in JP-A-09-167230, the ridge line candidate selecting unit 15 evaluates the continuity in each adjacent region, and selects a ridge line candidate image having a good continuity from the ridge line candidate images, and then, supplies the number of the selected candidate to the valid region determining unit 17 and the image generation unit 16.

For each of all the ridge line candidate images selected by the ridge line candidate selecting unit 15, the valid region determining unit 17 determines whether or not it is adopted as a final ridge line candidate (S208), and notifies the result to the adjacent region group detecting unit 14.

Now, a specific processing for determining whether or not the final ridge line candidate is adopted in the valid region determining unit 17, will be described.

In this processing, the continuity of local information, the degree of concentration of the power spectrum in the local image to the ridge line candidate image, and the ridge line pitch in the ridge line candidate image, which are exemplified by the direction $d_n^{(i,j)}$, the pitch $f_n^{(i,j)}$, and the phase $ph_n^{(i,j)}$, between the ridge line candidate image to be evaluated and the highly reliable ridge line candidate of the peripheral highly reliable region (in second and succeeding processing, between the ridge line candidate image to be evaluated and the ridge line candidate of the peripheral highly reliable region for which the selection processing has already been completed at that time), are evaluated, and whether or not the ridge line candidate image selected by the ridge line candidate selecting unit 15 is adopted, is determined on the basis of the result of the evaluation.

For example, when the continuity of the direction is used, if the direction of the ridge line of the ridge line candidate image selected in the local region to be evaluated, is d ($0 \leq d \leq \pi$), and when the direction representing the direction of the ridge line in the adjacent local region (the direction of a sum of directional vectors) is $d_n$ ($0 \leq d_n \leq \pi$), if the following J(d, $d_n$) is smaller than a certain threshold, it is determined to adopt the ridge line candidate image. Nevertheless, the ridge line candidate image is not adopted.

$$J(d, d_n) = \begin{cases} |2d - 2d_n|/2 & \text{where } |d - d_n| \leq \pi/2 \\ \pi - |2d - 2d_n|/2 & \text{where } |d - d_n| > \pi/2 \end{cases}$$

When the degree of concentration of the power spectrum in the local image is used, if a ratio obtained by dividing a total of the power spectrum of the ridge line candidate image by a total of the power spectrum of the corresponding local region image is smaller than a certain threshold, it is determined to adopt the ridge line candidate image. Nevertheless, the ridge line candidate image is not adopted.

When the ridge line pitch in the ridge line candidate image is used, if the ridge line pitch is within a range which can be considered to be a ridge line, it is determined to adopt the ridge line candidate image. Nevertheless, the ridge line candidate image is not adopted.

This discrimination process can be executed by using the above mentioned characteristic amounts singly or in combination.

In the example shown in FIG. 3, the processing starts from the local region "B". The solid line indicates the local regions which have been determined to be adopted as the ridge line candidate, and the dotted line indicates the local regions which have been determined not to be adopted as the ridge line candidate. In this case, it is determined that a remarkably discontinuous local information as in a region such as a core or a delta having a high curvature should not be adopted, so that a portion where discontinuity exists is not selected at once, and the selection processing goes in only highly continuous local regions.

Thereafter, the processing goes into the step S205, and the processing is carried out for finding out all the adjacent regions adjacent to the local region for which the selection processing has already been completed. In the example of FIG. 3, this processing corresponds to local regions of a second innermost encincture positioned at the outside of the highly reliable region. Next, whether or not one or more adjacent regions exist, is discriminated in the step S206, and for each of all the adjacent regions thus detected, the ridge line image is selected from the ridge line candidate images in the step S207. In a step S208, whether or not the result of selection is adopted, is determined. In this case, since the adjacent regions are in the second innermost encincture surrounding the highly reliable region, when the continuity of the local information such the direction, the pitch and the phase is evaluated as mentioned above, the continuity of the local information such the direction, the pitch and the phase between the ridge line candidate image to be evaluated and the ridge line candidate image of the peripheral adjacent image for which the selection processing has been completed, is evaluated.

As a result, the processing starts from the region "C" as shown in FIG. 3, so that for each adjacent region, whether or not the ridge line image should be adopted, is determined as shown by the solid line and the dotted line. In the following, the processing of the steps S205 to S208 is repeated, and if it is discriminated in the step S206 that there is no adjacent region, the image generation unit 16 generates a whole ridge line image on the basis of the ridge line candidate selected by the ridge line candidate selecting unit 15, the ridge line candidate which is discriminated by the highly reliable region determining unit 13 to have a high likelihood representing the ridge line, or the local information obtained from the local information extracting unit 12 (S209).

Figure 4:
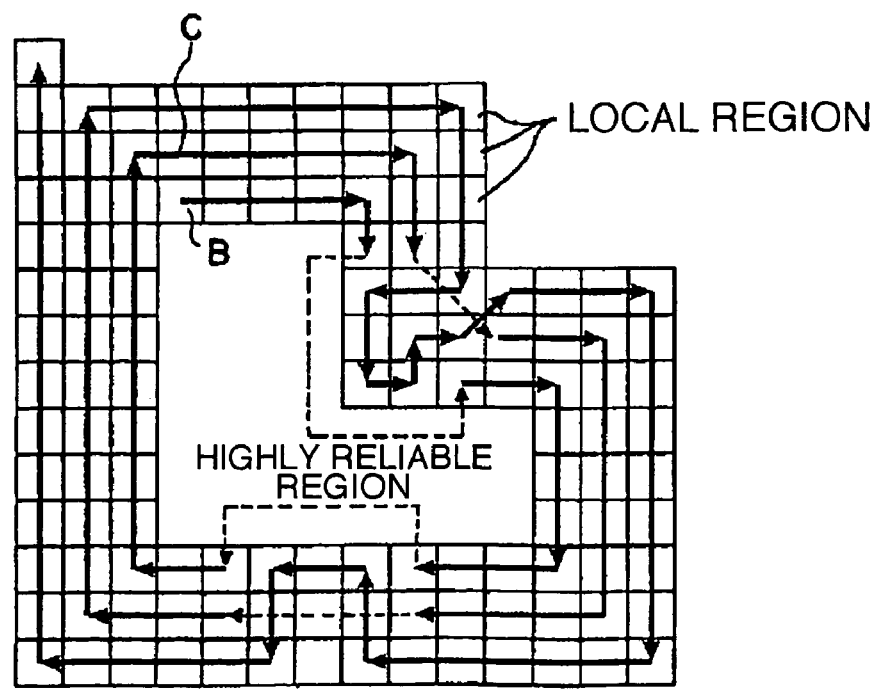
FIG. 4 illustrates the sequence of selection of a ridge line candidate image for a region which was not adopted as a ridge line image.

Incidentally, the region which was not adopted as the ridge line image in the step S205 may be used as a region to be selected. FIG. 4 illustrates the sequence of the selection of the ridge line candidate image in this case. The solid line indicates the local regions which have been determined to be adopted as the ridge line candidate, and the dotted line indicates the local regions which have been determined not to be adopted as the ridge line candidate. As seem comparison between FIG. 4 and FIG. 3, the number of dotted line regions is smaller than the number of those shown in FIG. 3. With this arrangement, the region which was not adopted in the step S205 is selected, and a ridge line can be obtained for a larger number of regions.

Figure 5:
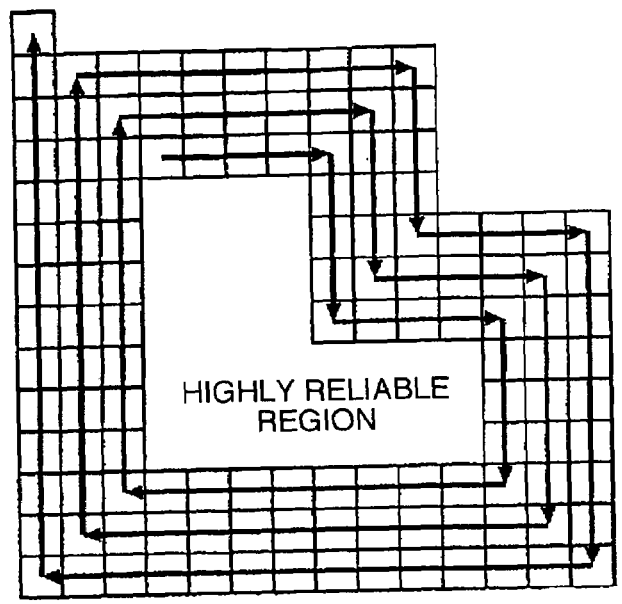
FIG. 5 illustrates the sequence of selection of a ridge line candidate image in the prior art.
Figure 6:
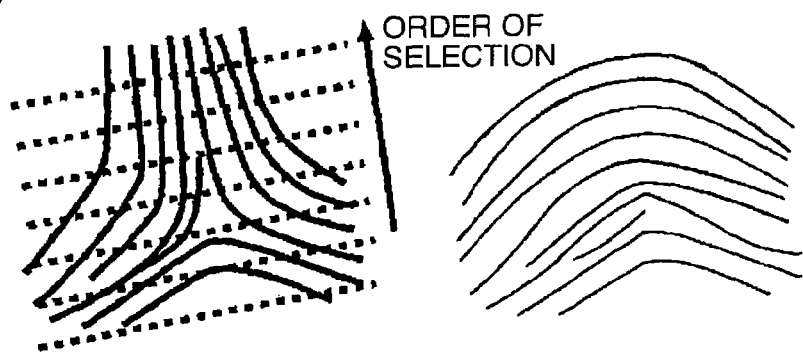
FIG. 6 illustrates the sequence of selection of a ridge line candidate in the prior art manner.
Figure 7:
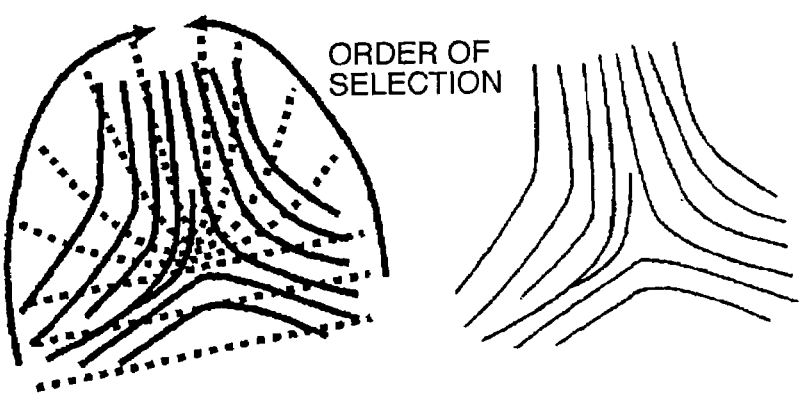
FIG. 7 illustrates the sequence of selection of a ridge line candidate in the fingerprint/palmprint image in the embodiment shown in FIG. 1.

Here, in the prior art ridge line candidate selection shown in JP-A-09-167230, the ridge line candidates are selected in the order from a local region close to a highly reliable region, as shown in FIGS. 5 and 6. In this embodiment, on the other hand, the valid region determining unit 17 determines whether or not the ridge line candidate image selected by the ridge line candidate selecting unit 15 is adopted as a final ridge line image. As a result, as shown in FIGS. 3 and 7, the region which should not be adopted is selected, so as to prevent misunderstanding of the ridge line in this region.

In this case, it is considered that a region which has a large curvature, such as a core, a delta, or a proximity of a wall-like pattern, and which is a remarkable discontinuous portion in the local information, as shown in FIG. 8, is a region which should not be adopted. Accordingly, a portion in which discontinuity exists, is not adopted at once, and the selection processing goes in only regions having a highly continuity in the local information. However, since the regions continuously changes and continues at such a discontinuity in the whole of the image, all the regions can be selected by selecting the continuous portions as a bypassing route without selecting at the discontinuity (See FIG. 7).

If the selection in a discontinuous region was carried out without considering the nature of the region as in the prior art method, a candidate having a large difference in a local information must be selected, and therefore, if a standard of selecting such a candidate is used, the candidate selection is subjected to an adverse influence in other portions, particularly, in a region where many wrinkles exist. However, as in the shown embodiment, if the selection at the discontinuity is avoided by changing the order of selection, it is possible to properly select the ridge line from all the regions on the basis of the standard of selecting a candidate having a small difference in a local information. In the prior art, since the selection was forcefully advanced even in a local region having a small degree of continuity, a ridge line candidate image attributable to the wrinkle was often erroneously selected. However, this situation can be avoided in this embodiment.

Also in this embodiment, only a ridge line candidate image having a small difference in direction to the ridge line candidate image in an adjacent local region is regarded as being valid, and whether or not it is a discontinuity is evaluated from the difference in direction. Since in the ridge line candidate selection it becomes an effective characteristic amount indicative of whether or not the ridge line direction is a ridge line, it is possible, by using the direction information, to precisely detect the discontinuity which has possibility of failing in the ridge line candidate image selection. Furthermore, the degree of likelihood of ridge line of the selected ridge line candidate image is evaluated by discriminating whether or not the pitch is within the range where it can exist as a ridge line, or by discriminating whether or not the power spectrum is concentrated at one point, so that only the ridge line candidate images having the degree of likelihood not less than a predetermined level are regarded as being valid. With this arrangement, even if the wrinkle having a continuity in the ridge line direction was erroneously selected in a portion having a good image quality and a high curvature of the ridge line, it is not finally adopted because the degree of likelihood of ridge line is small. Namely, the discontinuity where the selection failed, can be detected. On the other hand, if the selection resulted in success at the discontinuity, since it is not necessary to perform the selection later, the efficiency of the processing can be elevated.

Figure 9:
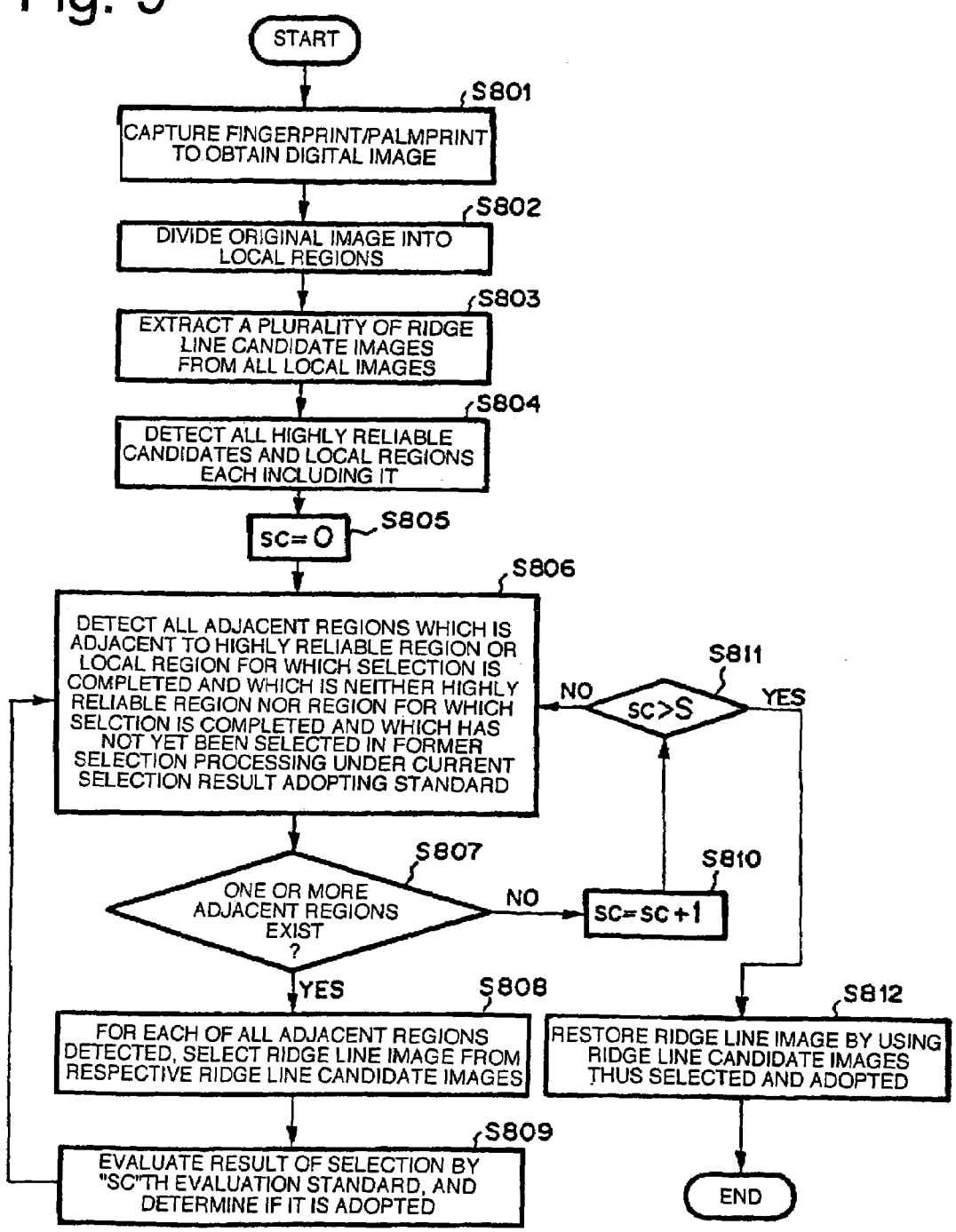
FIG. 9 is a flow chart illustrating an operation of a second embodiment of the fingerprint/palmprint image processing system in accordance with the present invention.

Now, a second embodiment of the present invention will be explained. The system of the second embodiment has the same construction as that shown in FIG. 1, but the processing method is different from that shown in FIG. 2. FIG. 9 is a flow chart illustrating an operation of the second embodiment of the fingerprint/palmprint image processing system in accordance with the present invention. In FIG. 9, the steps S801 to S804 correspond to the steps S201 to S204 shown in FIG. 2, respectively.

If a highly reliable candidate and a highly reliable region including the highly reliable candidate are determined in the step S804, a variable "SC" is set to "0" (zero) (S805). Succeedingly, the adjacent region group detecting unit 14 selects all regions adjacent to the highly reliable region (S806). For example, in the example shown in FIG. 3, local regions of a first single innermost encincture closely surrounding the highly reliable region correspond to the adjacent regions. Furthermore, whether or not one or more adjacent regions are detected, is discriminated (S807). Thereafter, similarly to the first embodiment, for each of all the adjacent regions, the ridge line candidate selecting unit 15 selects a ridge line image from the ridge line candidate images (S808). The number of the selected candidate is supplied to the adjacent region group detecting unit 14, the valid region determining unit 17 and the image generation unit 16.

In the valid region determining unit 17, the selected candidate image is evaluated by a (SC)th evaluation standard (SC=0 in this case), and for each of all the selected ridge line candidate images, whether or not it should be adopted as a final ridge line candidate is discriminated (S809), and the result of the discrimination is notified to the adjacent region group detecting unit 14. Specifically, similarly to the first embodiment, the valid region determining unit 17 evaluates the local information continuity, the degree of concentration of the power spectrum of the local image to the ridge line candidate image, and the ridge line pitch in the ridge line candidate image, which are exemplified by the direction, the pitch, and the phase, between the ridge line candidate image to be evaluated and the highly reliable ridge line candidate in the peripheral highly reliable region, and determines on the basis of the result of the evaluation, whether or not the ridge line candidate image selected by the ridge line candidate selecting unit 15 should be adopted. The standard used for determining whether or not it is adopted, is used until the adjacent region detected by the adjacent region group detecting unit 14 becomes zero, and if it becomes zero, the standard is changed to a new standard.

For example, only adjacent local regions having a direction difference of not greater than a certain threshold are adopted, and when the adjacent local regions to be adopted becomes zero, the adjacent local regions are adopted regardless of the direction difference In addition, the local information extracting unit 12 performs a two-dimensional Fourier transformation for each local region, extracts a plurality of peaks corresponding to different two-dimensional sine waves, on the resultant Fourier transformation plane, in the order from the largest amplitude or the largest energy in the vicinity of peak, and converts the two-dimensional sine waves corresponding to the peaks, into ridge line candidate images. In this case, the valid region determining unit 17 evaluates only the ridge line candidate images having a maximum energy peak in the proximity of the peak, as being valid, and if the region considered to be valid in accordance with this standard become zero, the regions are adopted regardless of the energy in the vicinity of peak.

Thereafter, the processing returns to the step S806, the processing of the steps S806 to S809 is repeated. At this time, the evaluation is carried out with the same evaluation standard in the step S809, so as to determine whether or not the ridge line candidate image is adopted as the ridge line image. In the step S807, if it is discriminated that one or more adjacent regions do not exist, it is changed to SC=SC+1 (S810), and thereafter, the value of "SC" ("1" in this case) is compared with a predetermined value of "S" (for example, "2") (S811). In this example, since the value of "SC" is not greater than the value of "S", the processing returns to the step S806, so that the processing of the steps S806 to S809 is repeated.

In this case, however, in the step S806, the adjacent region which was never selected under the former selection standard (for example, a region shown in the dotted line in the example of FIG. 3) becomes a region to be selected under the current or new selection standard. On the other hand, for each of all the adjacent regions detected, the candidate selection processing is carried out in the step S808. In the step S809, the evaluation is carried out with the (SC=1)th evaluation standard so as to determine whether or not the region is adopted. In this case, as mentioned above, if the former selection standard is, for example, whether or not the direction difference is not greater than a threshold, the current or new evaluation standard is that the regions are adopted regardless of the direction difference. Furthermore, as mentioned above, if the former selection standard is that only ridge line candidate image having a maximum energy peak in the proximity of the peak, are considered as being valid, the current or new evaluation standard is that the regions are adopted regardless of the energy in the vicinity of peak.

In the step S807, if the adjacent region becomes zero, it is changed to SC=SC+1 in the step S810, and thereafter, the value of "SC" is compared with the value of "S" in the step S811. At this time, if it is discriminated in the step S811 that the value of "SC" is greater than the value of "S", the image generation unit 16 generates a whole ridge line image on the basis of the ridge line candidate selected by the ridge line candidate selecting unit 15, the ridge line candidate which is discriminated by the highly reliable region determining unit 13 to have a high likelihood representing the ridge line, or the local information obtained from the local information extracting unit 12 (S812).

In this embodiment, at each time the region, which is considered to be valid by the valid region determining unit 17, becomes zero, the evaluation standard for considering as being valid is changed. In the first embodiment, if the region is surrounded by the discontinuity, the selection of the ridge line candidate image can be no longer performed, but in the second embodiment, if the selection of the ridge line candidate image cannot be advanced because the region is surrounded by the discontinuity, the selection of the ridge line candidate image can be advanced by changing the standard for selecting a valid region, so that a ridge line extraction can be performed in a larger extent.

Furthermore, in this embodiment, only ridge line candidate images having a small direction difference from the ridge line candidate image in the adjacent local region are considered to be valid. If the local regions which can be selected become zero, the selection of the ridge line candidate image is unconditionally carried out from the local region for which the selection has not yet been completed and which is adjacent to the local region for which the selection was completed. Thus, the ridge line selection can be performed for a portion which has become surrounded by the discontinuity in the case that the standard is the direction difference. Furthermore, the degree of likelihood of ridge line of the selected ridge line candidate image is evaluated by discriminating whether or not the pitch is within the range where it can exist as a ridge line, or by discriminating whether or not the power spectrum is concentrated at one point, so that only the ridge line candidate images having the degree of likelihood not less than a predetermined level are regarded as being valid. Then, if the local regions which can be selected become zero, the selection of the ridge line candidate image is unconditionally carried out from the local region for which the selection has not yet been completed and which is adjacent to the local region for which the selection was completed. Thus, the ridge line selection can be performed for a portion which has become surrounded by the discontinuity.

Moreover, in this embodiment, only ridge line candidate images having a maximum energy peak in the proximity of the peak, are considered as being valid. Even if the wrinkle having a continuity in the ridge line direction was erroneously selected in a portion having a good image quality and a high curvature of the ridge line, the selection is not adopted because in many cases the energy in the proximity of the peak does not become the maximum peak in such a ridge line candidate image. Namely, the discontinuity where the selection failed, can be detected. On the other hand, if the selection resulted in success at the discontinuity, since it is not necessary to perform the selection later, the efficiency of the processing can be elevated. Then, if the local regions which can be selected become zero, the selection of the ridge line candidate image is unconditionally carried out from the local region for which the selection has not yet been completed and which is adjacent to the local region for which the selection was completed. Thus, the ridge line selection can be performed for a portion which has become surrounded by the discontinuity under only the standard that the energy is a maximum peak.

Incidentally, a computer program in accordance with the present invention is a program describing the procedure for executing the method for processing the above mentioned fingerprint/palmprint image. Namely, it is a program for causing a computer to execute a procedure of dividing a fingerprint/palmprint image into a plurality of local regions and of extracting a plurality of ridge line candidate images which represents ridge lines, for each of the local regions, a highly reliable region determining procedure of determining, from the ridge line candidate images thus extracted, a ridge line candidate image having a high likelihood of ridge line, and a local region including the ridge line candidate image having the high likelihood of ridge line, as a highly reliable region, a procedure of selecting a ridge line image which can be estimated to represent a ridge line, from the ridge line candidate images extracted by the extracting procedure, for each of the local regions other than the highly reliable region, a discriminating procedure of discriminating, for each ridge line image thus selected, whether or not the ridge line image thus selected is valid as an image representing a ridge line, and a procedure of generating a whole image on the basis of the ridge line image in the highly reliable region and the ridge line images which were discriminated by the discriminating procedure to be valid as the image representing the ridge line.

As mentioned above, according to the present invention, it is possible to precisely extract the ridge line both in a region having wrinkles existing mixedly together with a ridge line and in a region including a ridge line having a large curvature. Namely, since whether or not the ridge line candidate image selected by the ridge line candidate selecting unit is adopted as a final ridge line image is determined by the valid region determining unit, it is possible to prevent an erroneous selection of a ridge line in a region which should not be adopted.

Here, a region which has a large curvature, such as a core, a delta, or a proximity of a wall-like pattern, and which is a remarkable discontinuous portion in the local information, is a region which should not be adopted. Accordingly, a portion in which discontinuity exists, is not adopted at once, and the selection processing goes in only regions having a highly continuity in the local information. However, since the regions continuously changes and continues at such a discontinuity in the whole of the image, all the regions can be selected by selecting the continuous portions as a bypassing route without selecting at the discontinuity.

If the selection in a discontinuous region was carried out without considering the nature of the region as in the prior art method, a candidate having a large difference in a local information must be selected, and therefore, if a standard of selecting such a candidate is used, the candidate selection is subjected to an adverse influence in other portions, particularly, in a region where many wrinkles exist. However, as in the present invention, if the selection at the discontinuity is avoided by changing the order of selection, it is possible to properly select the ridge line from all the regions on the basis of the standard of selecting a candidate having a small difference in a local information. In the prior art, since the selection was forcefully advanced even in a local region having a small degree of continuity, a ridge line candidate image attributable to the wrinkle was often erroneously selected. However, this situation can be avoided in this invention.

The invention has thus been shown and described with reference to the specific embodiments. However, it should be noted that the present invention is in no way limited to the details of the illustrated structures but changes and modifications may be made within the scope of the appended claims.

The invention claimed is:

1. A fingerprint/palmprint image processing system comprising a means for reading a fingerprint/palmprint image, an extracting means for dividing the fingerprint/palmprint image into a plurality of local regions and for extracting a plurality of ridge line candidate images which represents ridge lines, for each of the local regions, a highly reliable region determining means for determining, from the ridge line candidate images thus extracted, a ridge line candidate image having a high likelihood of ridge line, and a local region including the ridge line candidate image having the high likelihood of ridge line, as a highly reliable region, a selecting means for selecting a ridge line image which can be estimated to represent a ridge line, from the ridge line candidate images extracted by said extracting means, for each of the local regions other than the highly reliable region, a discriminating means for discriminating, for each ridge line image thus selected, whether or not the ridge line image thus selected is valid as an image representing a ridge line, and means for generating a whole image on the basis of the ridge line image in the highly reliable region and the ridge line image which were discriminated by said discriminating means to be valid as the image representing the ridge line wherein said discriminating means discriminates that the local region of the ridge line candidate image is valid if it has at least some degree of continuity to the local region determined as the highly reliable reason or otherwise is not valid, and said selecting means does not select the ridge line candidate image in the local region that was discriminated by said discriminating means as being not valid, said selecting means further selects one or more other regions being valid so that said discriminating means discriminates whether or not the ridge line image thus selected is valid and thereafter said selects means selects the a ridge line image in the local region that was discriminated by said discriminating means as being valid.

2. A fingerprint/palmprint image processing system, claimed in claim 1, wherein said discriminating means discriminates, as being valid, the ridge line candidate image having a difference between the ridge line direction of a ridge line image to be evaluated and the ridge line direction of a peripheral ridge line image, said difference being not greater than a threshold.

3. A fingerprint/palmprint image processing system, claimed in claim 1, wherein said discriminating means evaluates the likelihood of ridge line of the ridge line candidate image on the basis of a ridge line pitch or a deviation of the power spectrum, and discriminates, as being valid, the ridge line candidate image having the likelihood of ridge line not less than a predetermined level.

4. A fingerprint/palmprint image processing system comprising a means for reading a fingerprint/palmprint image, an extracting means for dividing the fingerprint/palmprint image into a plurality of local regions and for extracting a plurality of ridge line candidate images which represents ridge lines, for each of the local regions, a highly reliable region determining means for determining, from the ridge line candidate images thus extracted, a ridge line candidate image having a high likelihood of ridge line, and a local region including the ridge line candidate image having the high likelihood of ridge line, as a highly reliable region, a selecting means for selecting a ridge line image which can be estimated to represent a ridge line, from the ridge line candidate images extracted by said extracting means, for each of the local regions other than the highly reliable region, a discriminating means for each ridge line image thus selected, whether or not the ridge line image thus selected is valid as an image representing a ridge line, and means for generating a whole image on the basis of the ridge line image in the highly reliable region and the ridge line image which were discriminated by said discriminating means to be valid as the image representing the ridge line,
wherein said discriminating means changes an evaluation standard for determining a valid region at each time the local region to be selected in a valid region discriminating processing, becomes zero.

5. A fingerprint/palmprint image processing system, claimed in claim 4, wherein said discriminating means discriminates, as being valid, the ridge line candidate image having a difference between the ridge line direction of a ridge line image to be evaluated and the ridge line direction of a peripheral ridge line image, said difference being not greater than a threshold, and if the local region to be selected in the valid region discriminating processing, becomes zero, said discriminating means discriminates, as being valid, the ridge line candidate image, regardless of the difference in the ridge line direction.

6. A fingerprint/palmprint image processing system, claimed in claim 4, wherein said discriminating means evaluates the likelihood of ridge line of the ridge line candidate image on the basis of a ridge line pitch or a deviation of the power spectrum, and discriminates, as being valid, the ridge line candidate image having the likelihood of ridge line not less than a predetermined level, and if the local region to be selected in the valid region discriminating processing, becomes zero, said discriminating means discriminates, as being valid, the ridge line candidate image, regardless of the likelihood of ridge line.

7. A fingerprint/palmprint image processing system, claimed in claim 4, wherein said extraction means performs a two-dimensional Fourier transformation for each local region, extracts a plurality of peaks corresponding to different two-dimensional sine waves, on the resultant Fourier transformation plane, in the order from the largest amplitude or the largest energy in the vicinity of peak, and converts the two-dimensional sine waves corresponding to the peaks into ridge line candidate images, and wherein said discriminating means evaluates the ridge line candidate images having a maximum energy peak in the proximity of the peak, as being valid, and if the region considered to be valid in the valid region determining process become zero, said discriminating means evaluates the ridge line candidate images as being valid, regardless of the energy in the vicinity of peak.

8. A fingerprint/palmprint image processing method comprising a step of reading a fingerprint/palmprint image, an extracting step of dividing the fingerprint/palmprint image into a plurality of local regions and of extracting a plurality of ridge line candidate images which represents ridge lines, for each of the local regions, a highly reliable region determining step of determining, from the ridge line candidate images thus extracted, a ridge line candidate image having a high likelihood of ridge line, and a local region including the ridge line candidate image having the high likelihood of ridge line, as a highly reliable region, a step of selecting a ridge line image which can be estimated to represent a ridge line, from the ridge line candidate images extracted by the extracting step, for each of the local regions other than the highly reliable region, a discriminating step of discriminating, for each ridge line image thus selected, whether or not the ridge line image thus selected is valid as an image representing a ridge line, and a step of generating a whole image on the basis of the ridge line image in the highly reliable region and the ridge line images which were discriminated by the discriminating step to be valid as the image representing the ridge line, wherein in said discriminating step, the local region of the ridge line candidate image is discriminated as being valid if it has at least some degree of continuity to the local region determined as the highly reliable region or otherwise as being not valid, and in said selecting step, the ridge line candidate image is not selected in the local region that was discriminated by said discriminating step as being not valid, but said selecting step further selects one or more other regions being valid so that said discriminating step discriminates whether or not the ridge line image thus selected is valid and thereafter said selecting step selects the a ridge line image in the local region that was discriminated by said discriminating step as being valid.

9. A program for causing a computer to execute a procedure of dividing a fingerprint/palmprint image into a plurality of local regions and of extracting a plurality of ridge line candidate images which represents ridge lines, for each of the local regions, a highly reliable region determining procedure of determining, from the ridge line candidate images thus extracted, a ridge line candidate image having a high likelihood of ridge line, and a local region including the ridge line candidate image having the high likelihood of ridge line, as a highly reliable region, a procedure of selecting a ridge line image which can be estimated to represent a ridge line, from the ridge line candidate images extracted by the extracting procedure, for each of the local regions other than the highly reliable region, a discriminating procedure of discriminating, for each ridge line image thus selected, whether or not the ridge line image thus selected is valid as an image representing a ridge line, and a procedure of generating a whole image on the basis of the ridge line image in the highly reliable region and the ridge line images which were discriminated by the discriminating procedure to be valid as the image representing the ridge line wherein in said discriminating procedure, the local region of the ridge line candidate image is discriminated as being valid if it has at least some degree of continuity to the local region determined as the highly reliable region or otherwise as being valid, and in said selecting procedure the ridge line candidate image is not selected in the local region that was discriminated by said discriminating procedure as being not valid but said selecting procedure further selects one or more other regions being valid so that said discriminating procedure discriminates whether or not the ridge line image thus selected is valid and thereafter said selecting procedure selects the a ridge line image in the local region that was discriminated said discriminating procedure as being valid.

* * * * *